(12) United States Patent
Asai et al.

(10) Patent No.: US 7,852,798 B2
(45) Date of Patent: Dec. 14, 2010

(54) RELAY NODE AND RELAY METHOD

(75) Inventors: Takahiro Asai, Yokosuka (JP); Hitoshi Yoshino, Yokosuka (JP); Hui Shi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 691 days.

(21) Appl. No.: 11/844,642

(22) Filed: Aug. 24, 2007

(65) Prior Publication Data

US 2008/0049658 A1 Feb. 28, 2008

(30) Foreign Application Priority Data

Aug. 28, 2006 (JP) ............................ P2006-230910

(51) Int. Cl.
*H04B 7/14* (2006.01)
(52) U.S. Cl. ...................................... 370/315
(58) Field of Classification Search ........................ None
See application file for complete search history.

(56) References Cited

U.S. PATENT DOCUMENTS

| 2007/0190934 | A1 | 8/2007 | Kim et al. | |
|---|---|---|---|---|
| 2009/0161605 | A1* | 6/2009 | Shen et al. | 370/328 |
| 2009/0161641 | A1* | 6/2009 | Kim | 370/338 |

FOREIGN PATENT DOCUMENTS

| JP | 2006-148867 | 6/2006 |
|---|---|---|
| JP | 2006-148868 | 6/2006 |

OTHER PUBLICATIONS

Hui Shi, et al., "A Relaying Scheme using QR Decomposition with Phase Control for MIMO Wireless Networks," Proceedings IEEE International Conference on Communications, Seoul, May 2005, pp. 2705-2711.
Hui Shi, et al., "Relay Techniques in MIMO Wireless Networks," Proceedings IEEE Vehicular Technology Conference, Sep. 2005, pp. 2438-2443.
Tetsushi Abe, et al; "A Relaying Scheme for MIMO Wireless Networks with Multiple Source and Destination Pairs", Asia-Pacific Conference on Communications, IEEE, Oct. 3, 2005, pp. 77-81.

* cited by examiner

*Primary Examiner*—Anh-Vu Ly
(74) *Attorney, Agent, or Firm*—Oblon, Spivak, McClelland, Maier & Neustadt, L.L.P.

(57) ABSTRACT

To improve the channel capacity of an entire communication system in accordance with transmission quality of the channels of each node. A relay node has: a receiving section that receives a received signal from a source node; a channel estimation section that measures SNR of a backward channel between the source node and the relay node, and SNR of a forward channel between the relay node and a destination node; a relay selecting section that selects, from among a QR-P-ZF method, a QR-P-QR method and a ZF-P-QR method, a relay method of the relay node in accordance with the ratio between the SNRs of the backward and forward channels; a relay signal processing section that multiplies the received signal by a transmission weight matrix corresponding to the selected relay method, and thereby converts the received signal to a relay signal; and a transmitting section that transmits the relay signal to the destination node.

6 Claims, 9 Drawing Sheets

$$\begin{bmatrix} a_{11} & \cdots & a_{1M} \\ & \ddots & \vdots \\ 0 & & a_{MM} \end{bmatrix}$$

⇓

$$\begin{bmatrix} 0 & & a_{MM} \\ & \ddots & \vdots \\ a_{11} & \cdots & a_{1M} \end{bmatrix}$$

<QR-P-QR>

$$\begin{bmatrix} 0 & & b_{1M} \\ & \ddots & \vdots \\ b_{M1} & \cdots & b_{MM} \end{bmatrix}$$

⇓

$$\begin{bmatrix} 0 & & b_{1M} \\ & \ddots & \vdots \\ b_{M1} & \cdots & b_{MM} \end{bmatrix}$$

<ZF-P-QR>

$$\begin{bmatrix} c_{11} & & 0 \\ \vdots & \ddots & \\ c_{M1} & \cdots & c_{MM} \end{bmatrix}$$

⇓

$$\begin{bmatrix} 0 & & c_{11} \\ & \ddots & \vdots \\ c_{MM} & \cdots & c_{M1} \end{bmatrix}$$

RELAY NODE AND RELAY METHOD

BACKGROUND OF THE INVENTION

1. Field of the Invention

The present invention relates to a relay node and a relay method for relaying a radio signal using a multiple-input multiple-output (MIMO) system.

2. Related Background Art

In recent years, a MIMO multihop system, which is a combination of a multihop system and a MIMO system, is getting attention as a technology for relaying radio signals. In the multihop system, signals are transmitted from a source node, which is the source of the signals, to a destination node, which is the destination of the signals, via 1 or more relay nodes located between the source node and the destination node. This system has advantages that the range where signals can be received is expanded by relaying signals, that the signal transmittable areas are not theoretically limited, and that a wireless network can be established quickly. The MIMO system, meanwhile, is a communication system in which multiple transmitting antennas and receiving antennas are used to transmit and receive signals in order to increase the channel capacity through efficient use of a wireless space.

Regarding the MIMO multihop system, H. Shi, T. Abe, T. Asai, and H. Yoshino, "A Relaying Scheme using QR Decomposition with Phase control for MIMO wireless Networks," Proc. IEEE International Conf. On Communications Seoul, May 2005, p. 2705-2711, H. Shi, T. Abe, T. Asai, and H. Yoshino, "Relay Techniques in MIMO Wireless Networks," Proc. IEEE Vehicular Technology Conf., September 2005, p. 2438-2443, Japanese Unexamined Patent Application Publication No. 2006-148867, and Japanese Unexamined Patent Application Publication No. 2006-148868 disclose a technology of computing a transmission weight matrix on the basis of a channel matrix between the source node and the destination node in the relay node, and then multiplying a received signal by the transmission weight matrix to improve the diversity gain between the relay nodes and between the multiple antennas in each relay node. Specifically, "A Relaying Scheme using QR Decomposition with Phase control for MIMO wireless Networks," and "Relay Techniques in MIMO Wireless Networks" proposes QR-P-QR, QR-P-ZF, and ZF-P-QR as such system. QR-P-QR is a system for performing QR decomposition on a backward channel on the source node side and a forward channel on the destination node side. QR-P-ZF is a system for performing QR decomposition and then zero-forcing (ZF) on the backward and forward channels. ZF-P-QR is a system for performing zero-forcing and then QR decomposition on the backward and forward channels.

However, if the ratio between transmission quality of the forward channel and transmission quality of backward channel in each relay node (e.g., SNR ratio) changes, a different relay method should be used in order to achieve the maximum channel capacity. Therefore, if all of relay nodes uniformly select a relay method when they have different channel transmission quality, it becomes impossible to ensure that an appropriate relay method is always selected in the entire communication system, causing reduction in the channel capacity.

SUMMARY OF THE INVENTION

The present invention, therefore, has been contrived in view of such problems, and it is an object of the present invention to provide a relay node and a relay method that are capable of improving the channel capacity of an entire communication system in accordance with transmission quality of the channels of each node.

In order to achieve the above object, the relay node of the present invention is a relay node for relaying a transmission signal, which is transmitted from a source node, to a destination node by using a multiple-input multiple-output (MIMO) system, the relay node having: receiving means for receiving the transmission signal from the source node; measuring means for measuring at least either transmission quality of a backward channel that is a transmission path between the source node and the relay node, or transmission quality of a forward channel that is a transmission path between the relay node and the destination node; selecting means for selecting a relay method as a conversion scheme for converting the transmission signal in the relay node, from among a plurality of relay methods in accordance with at least either the backward channel transmission quality or the forward channel transmission quality that is estimated by the measuring means; converting means for converting the transmission signal to a relay signal by multiplying the transmission signal by a conversion matrix corresponding to the relay method selected by the selecting means; and transmitting means for transmitting the relay signal obtained by conversion by the converting means to the destination node.

Alternatively, the relay method of the present invention is a relay method for relaying a transmission signal, which is transmitted from a source node, to a destination node by using a multiple-input multiple-output (MIMO) system, the relay method having: a receiving step in which receiving means receives the transmission signal from the source node; a measuring step in which measuring means measures at least either transmission quality of a backward channel that is a transmission path between the source node and the relay node, or transmission quality of a forward channel that is a transmission path between the relay node and the destination node; a selecting step in which selecting means selects a relay method as a conversion scheme for converting the transmission signal in the relay node, from among a plurality of relay methods in accordance with at least either the backward channel transmission quality or the forward channel transmission quality estimated in the measuring step; a converting step in which converting means converts the transmission signal to a relay signal by multiplying the transmission signal by a conversion matrix corresponding to the relay method selected in the selecting step; and a transmitting step in which transmitting means transmits the relay signal obtained by conversion in the converting step to the destination node.

According to such a relay node and a relay method, at least either the backward channel transmission quality or the forward channel transmission quality is measured, a relay method to be applied in the relay node is selected in accordance with the measured transmission quality, and the transmission signal is multiplied by a conversion matrix corresponding to the selected relay method, whereby the transmission signal received from the source node is converted to a relay signal, and then this relay signal is transmitted to the destination node. Accordingly, a relay method that is suitable for the backward channel transmission quality or the forward channel transmission quality of each relay node is selected, so that the transmission signal is processed using this relay method. Therefore, the channel capacity is increased when each relay node is relayed, improving the channel capacity of the entire communication system effectively.

It is preferred that the relay node further have matrix calculation means for performing matrix calculation on the relay signal obtained by conversion by the converting means, so that coherent combining can be performed among the multiple relay methods on the destination node side, and that the transmitting means transmit the relay signal on which the matrix calculation is performed by the matrix calculation means. In this case, when a relay signal is received from each of multiple relay nodes in the destination node, the relay signals received from the respective relay nodes are coherently combined, thus the channel capacity of the entire system can be further improved.

Furthermore, it is preferred that the relay node further have determination means for determining whether or not to relay the transmission signal to the destination node, in accordance with at least either the backward channel transmission quality or the forward channel transmission quality measured by the measuring means, and that the transmitting means transmit the relay signal when the determination means determines to relay the transmission signal. In this manner, it is determined whether or not to relay the transmission signal by means of the relay node in accordance with the backward channel transmission quality or the forward channel transmission quality, thus it is possible to prevent the relay node from performing unwanted signal relay when the channel capacity is not ensured.

Moreover, it is preferred that the measuring means measure both the backward channel transmission quality and the forward channel transmission quality, that the selecting means select, in accordance with the backward channel transmission quality and the forward channel transmission quality that are estimated by the measuring means, a relay method from among a QR-P-QR method for performing QR decomposition on each of the backward and forward channels, a QR-P-ZF method for performing QR decomposition and then zero-forcing (ZF) on each of the backward and forward channels, and ZF-P-QR method for performing zero-forcing (ZF) and then QR decomposition on each of the backward and forward channels, and that, when the QR-P-ZF method is selected by the selecting means, the matrix calculation means perform matrix calculation such that the order of rows in an output matrix of the converting means is inverted, and when the ZF-P-QR method is selected by the selecting means, the matrix calculation means perform matrix calculation such that the order of columns in the output matrix of the converting means is inverted. With this configuration, the proper relay method is selected from among the QR-P-QR method, QR-P-ZF method and ZF-P-QR method on the basis of the backward channel transmission quality and forward channel transmission quality, and the matrix calculation is performed on the relay signal in accordance with the selected relay method so that coherent combining can be performed in the destination node. Consequently, the channel capacity of the entire system can be improved effectively.

In addition, it is preferred that the measuring means measure both the backward channel transmission quality and the forward channel transmission quality, and that the selecting means select the relay method in accordance with a ratio between the backward channel transmission quality and the forward channel transmission quality that are measured by the measuring means. In this case, since the characteristics of the channel capacity of each of the QR-P-QR method, QR-P-ZF method and ZF-P-QR method rely largely on the ratio between the backward channel transmission quality and the forward channel transmission quality, the channel capacity of the entire system can be improved more reliably.

According to the present invention, the channel capacity of the entire communication system can be improved in accordance with the transmission quality of the channels of each node.

BRIEF DESCRIPTION OF THE DRAWINGS

FIG. 9 is a diagram showing an image of the transmission weight matrix calculated in the relay node shown in FIG. 2.

DESCRIPTION OF THE PREFERRED EMBODIMENTS

Figure 1:
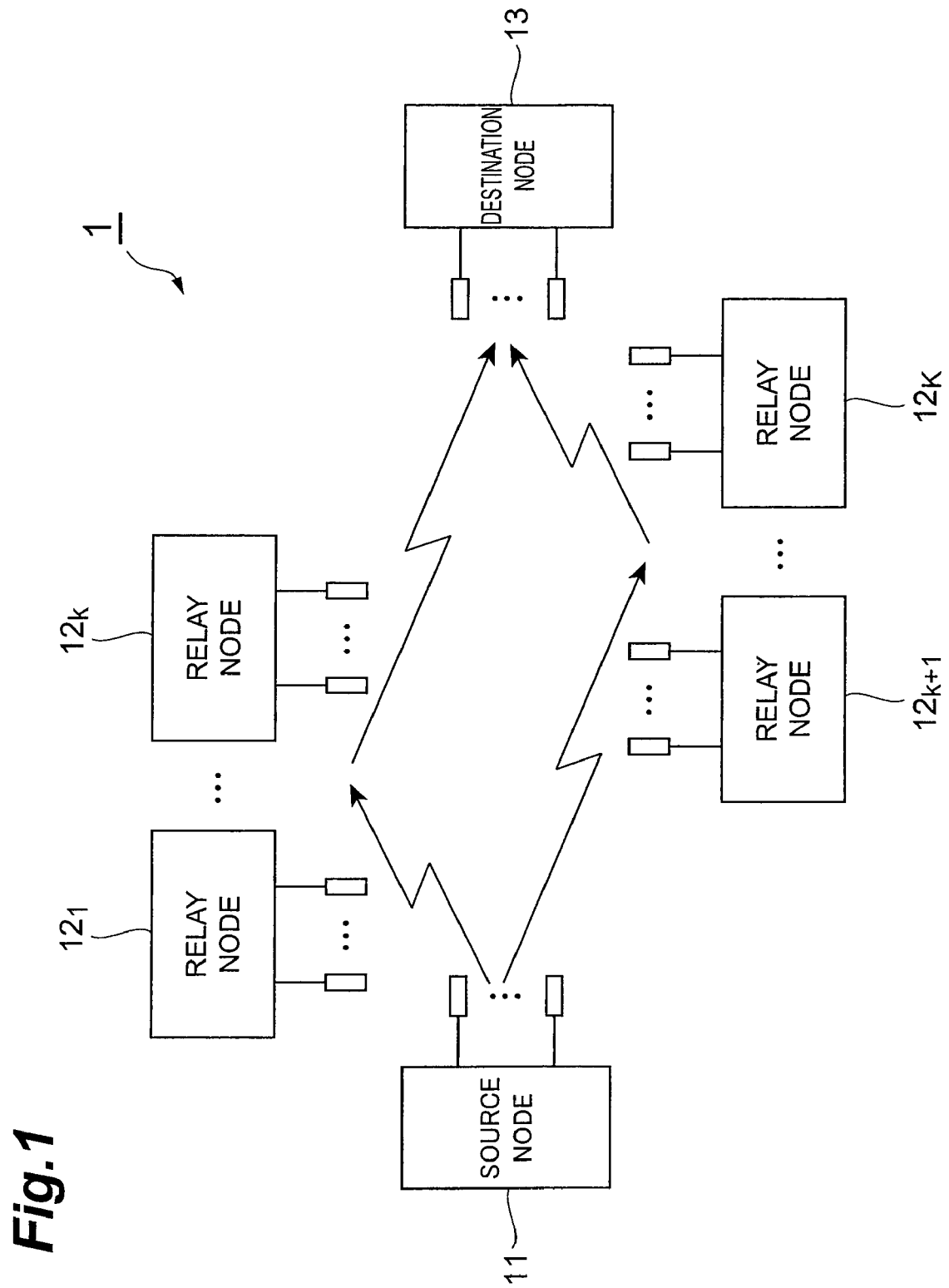
FIG. 1 is a diagram showing the configuration of a communication system 1 according to a preferred embodiment of the present invention.

Preferred embodiments of the relay node and relay method of the present invention will be described hereinafter in detail with reference to the drawings. It should be noted in the descriptions of the drawings that the same reference numerals are used to indicate the same elements, thus the overlapping explanations are omitted accordingly.

FIG. 1 is a diagram showing the configuration of a communication system 1 according to a preferred embodiment of the present invention. This communication system 1 is a system that uses a multiple-input multiple-output (MIMO) system to transmit a radio signal from a source node to a destination node, and is constituted by a source node 11, K number of (K is an integer of 1 or more) relay nodes $12_1, \ldots, 12_k, 12_{k+1}, \ldots 12_K$, and a destination node 13.

In this communication system 1, once a radio signal is transmitted from the source node 11 to the destination node 13, the relay nodes $12_1, \ldots, 12_k, 12_{k+1}, \ldots 12_K$ can relay the radio signal by one hop. Here, for simplification, it is assumed that the relay nodes $12_1, \ldots, 12_K$ of the communication system 1 have the same function. At this moment, radio communication in a backward channel between the source node 11 and each relay node $12_k$ (k=1, . . . K) and in a forward channel between the relay node $12_k$ and the destination node 13 is performed using the MIMO system.

The relay nodes $12_1, \ldots, 12_k, 12_{k+1}, \ldots 12_K$ may be configured so as to be able to relay the radio signals by multihop, when relaying the signals by mean of a regenerative relay system. Also, the source node 11 and the destination node 13 can also operate as the relay nodes, thus the source node 11 and the destination node 13 may be provided with the same function as the relay node $12_k$.

Next, the configuration of the relay node $12_k$ is described with reference to FIG. 2 and FIG. 3.

Figure 2:
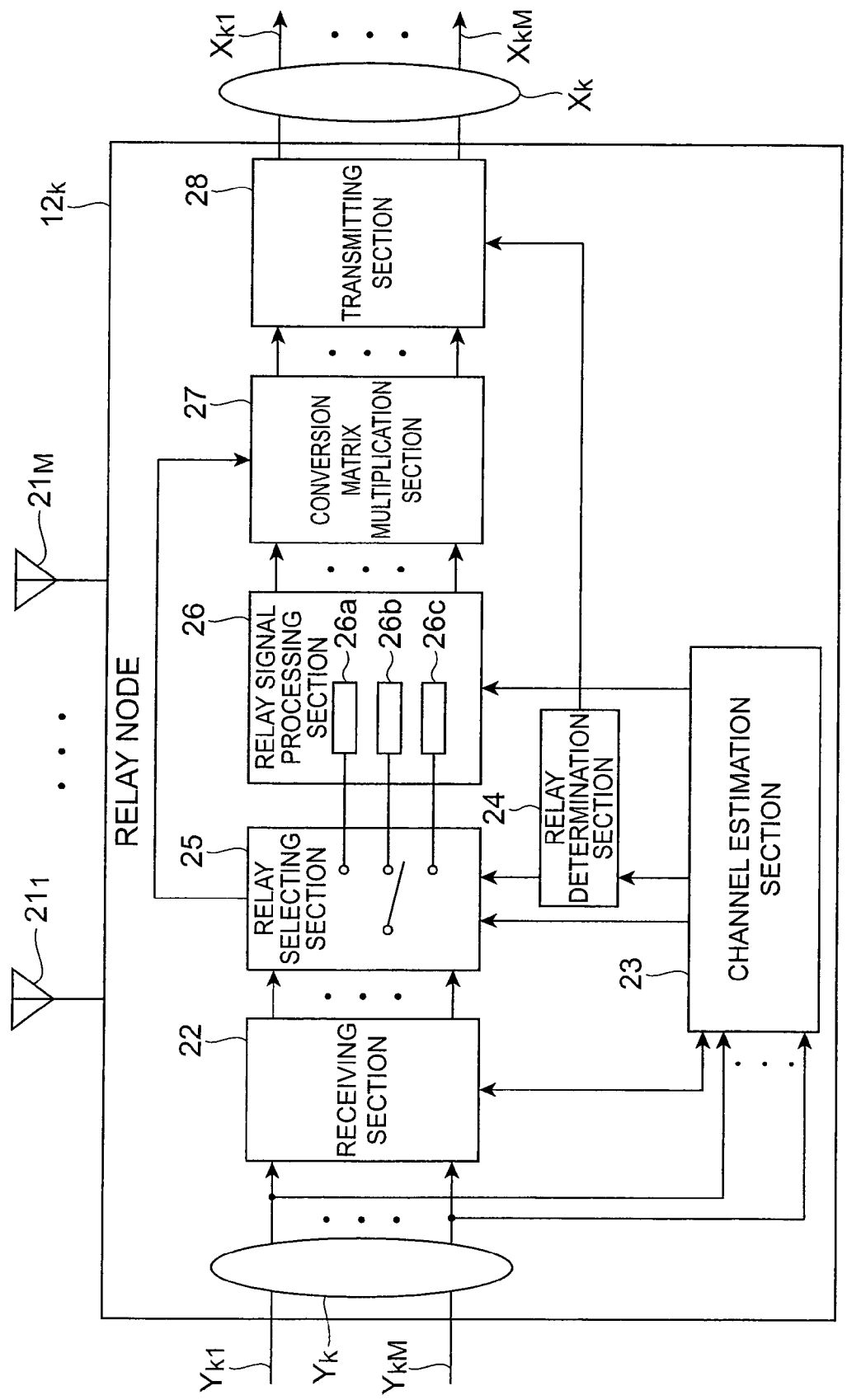
FIG. 2 is a block diagram showing the functional configuration of a relay node shown in FIG. 1.

As shown in FIG. 2, the relay node $12_k$ is, functionally, constituted by a receiving section 22 (receiving means), a channel estimation section (measuring means) 23, a relay determination section (determination means) 24, a relay selecting section (selecting means) 25, a relay signal processing section (converting means) 26, a conversion matrix multiplication section (matrix calculation means) 27, and a transmitting section (transmitting means) 28. The relay node $12_k$ also has M number of (M is an integer of 2 or more) radio antennas $21_1, \ldots, 21_M$ for transmitting and receiving the radio signals between the source node 11 and the destination node 13, and the receiving section 22 and transmitting section 28 uses the radio antennas $21_1, \ldots, 21_M$ for receiving and transmitting the signals. Here, for simplification, it is assumed that all of the relay nodes $12_k$ (k=1, ... K) have the same number of radio antennas, but they may have a different number of radio antennas including the source node 11 and destination node 13.

Figure 3:
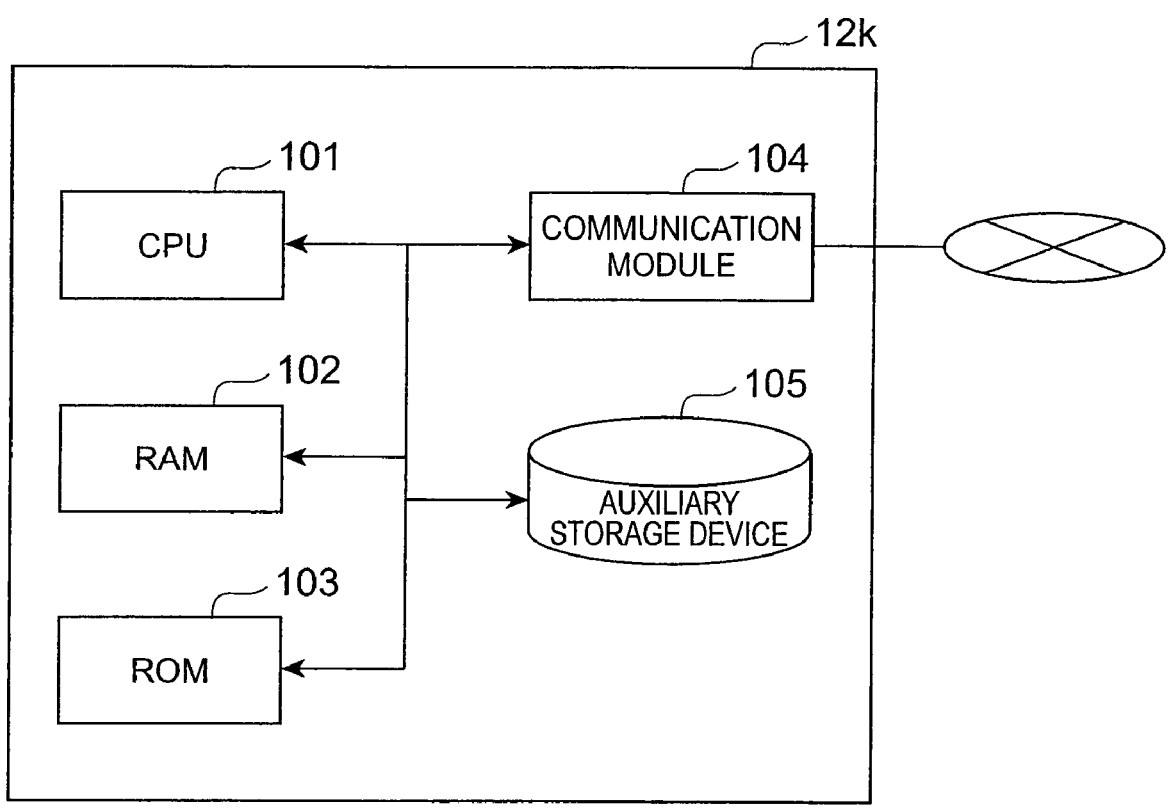
FIG. 3 is a diagram showing the hardware configuration of the relay node shown in FIG. 1.

FIG. 3 is a diagram showing the hardware configuration of the relay node $12_k$. As shown in FIG. 3, the relay node $12_k$, physically, is configured as a computer system having a CPU 101, RAM 102 and ROM 103 as the main storage devices, an auxiliary storage device 105 such as a hard disk, a communication module 104 as a signal transmitting/receiving device such as a wireless network card, and the like. Each of the functions illustrated in FIG. 2 is realized by causing the hardware, such as the CPU 101 and RAM 102 shown in FIG. 3, to read a predetermined computer software, to thereby operate the communication module 104 under the control of the CPU 101 and read and write data stored in the RAM 102 or auxiliary storage device 105. The communication module 104 is also configured so as to be able to transmit/receive the radio signals via the radio antennas $21_1, \ldots, 21_M$.

Each of the functional components of the relay node $12_k$ is described hereinafter in detail.

The receiving section 22 receives a transmission signal S from the source node 11 via the radio antennas $21_1, \ldots, 21_M$. Specifically, the receiving section 22 receives the transmission signal S, which propagated through the backward channel, from the source node 11 as a received signal $Y_k = (Y_{k1}, \ldots, Y_{km})$ having M number of signal components. The receiving section 22 also executes on the received signal $Y_k$ various types of processing, such as frequency conversion and band limitation in a receiving front-end, and weighting for each radio antenna $21_1, \ldots, 21_M$. The receiving section 22 also uses a channel matrix H of the backward channel estimated by the channel estimation section 23, described hereinafter, to analyze the header of the received signal $Y_k$ and thereby determine the destination of the transmission signal S. When the receiving section 22 determines that the destination is not the relay node $12_k$, the receiving section 22 outputs the received signal $Y_k$ on which the abovementioned various types of processing are performed, to the relay selecting section 25, and also outputs to the channel estimation section 23 the information on the determined destination of the received signal $Y_k$.

The channel estimation section 23 estimates a channel matrix $H_k$ of the backward channel that is a transmission path between the source node 11 and the relay node $12_k$, and also estimates a channel matrix $G_k$ of the forward channel that is a transmission path between the relay node $12_k$ and the destination node 13. Here, "channel matrix" means a matrix that is used when performing matrix calculation to combine/separate the signal corresponding to each of the radio antennas in the MIMO system. Specifically, the channel estimation section 23 receives a pilot signal, which is received from the source node 11 prior to the received signal $Y_k$, via the receiving section 22, and then estimates the channel matrix $H_k$ on the basis of this pilot signal. In the same manner, the channel estimation section 23 receives a pilot signal, which is received from the destination node 13, via the receiving section 22, and then estimates the channel matrix $G_k$ on the basis of this pilot signal. Here, the pilot signal from the destination node 13 is identified on the basis of the destination information in the header of the received signal $Y_k$.

Moreover, the channel estimation section 23 measures transmission quality of the backward channel and of the forward channel on the basis of the received signals, such as the pilot signals, and the channel matrices $H_k$ and $G_k$, in order to determine the quality of the channel conditions of the backward and forward channels. Examples of the transmission quality to be measured include SNR (Signal to Noise Ratio), SIR (Signal to Interference Ratio), path-loss (propagation loss) ratio, and the like. The channel estimation section 23 outputs the information on the measured transmission quality to the relay determination section 24 and relay selecting section 25, and further outputs the estimated channel matrices $H_k$ and $G_k$ to the receiving section 22 and relay signal processing section 26.

The relay determination section 24 determines whether or not to relay the received signal $Y_k$ to the destination node 13, on the basis of the transmission quality information received from the channel estimation section 23, outputs the result of the determination to the relay selecting section 25, and transmits the result of the determination to the source node 11 via the transmitting section 28. Specifically, when $SNR_{FC}^k$ and $SNR_{BC}^k$, which are the average received SNRs of the forward channel and the backward channel respectively, are measured by the channel estimation section 23, the relay determination section 24 uses a predetermined threshold value $Th_{SNR}$ to determine to relay the received signal $Y_k$ if the following equation (1) is established:

$$SNR_{BC}^k \geq Th_{SNR} \qquad (1)$$

If, on the other hand, the above equation (1) is not established, the relay determination section 24 determines not to relay the received signal $Y_k$, and transmits the information on the result of this determination to the source node 11. The threshold value $Th_{SNR}$ is determined by means of an experiment, theory, or computer simulation beforehand, and then stored in the relay nodes $12_k$.

When the relay determination section 24 determines to relay the received signal $Y_k$, the relay selecting section 25 selects, from among a plurality of relay methods, a relay method as a conversion scheme for converting the received signal $Y_k$, on the basis of the transmission quality information delivered from the channel estimation section 23. The QR-P-QR method for performing QR decomposition on each of the backward and forward channels, the QR-P-ZF method for performing QR decomposition and then zero-forcing (ZF) on each of the backward and forward channels, and the ZF-P-QR method for performing ZF and then QR decomposition on each of the backward and forward channels are set as the relay method to be selected.

Specifically, when the $SNR_{FC}^k$ and $SN_{RBC}^k$ are measured by the channel estimation section 23, the relay selecting section 25 calculates SNR ratio between the forward channel and the backward channel $\alpha_k = SNR_{BC}^k / SNR_{FC}^k$. Then, the relay selecting section 25 selects the ZF-P-QR method as the relay method when the following equation (2) is established:

$$\beta < \alpha_k \qquad (2)$$

The relay selecting section 25 selects the QR-P-QR method when the following equation (3) is established:

$$\gamma < \alpha_k < \beta \quad (3)$$

The relay selecting section 25 selects the QR-P-ZF method when the following equation (4) is established:

$$\alpha^k < \gamma \quad (4)$$

Here, $\beta$ and $\gamma$ are scalars where $\beta > \gamma$ is satisfied, and these scalars are previously set threshold values. The relay selecting section 25 outputs relay method information for specifying the selected relay method to the relay signal processing section 26 and the conversion matrix multiplication section 27.

The relay selecting section 25 also transfers the received signal $Y_k$ to any of a QR-P-ZF calculation section 26a, a QR-P-QR calculation section 26b and a ZF-P-QR calculation section 26c of the relay signal processing section 26 (see FIG. 4) in accordance with the selected relay means.

Figure 4:
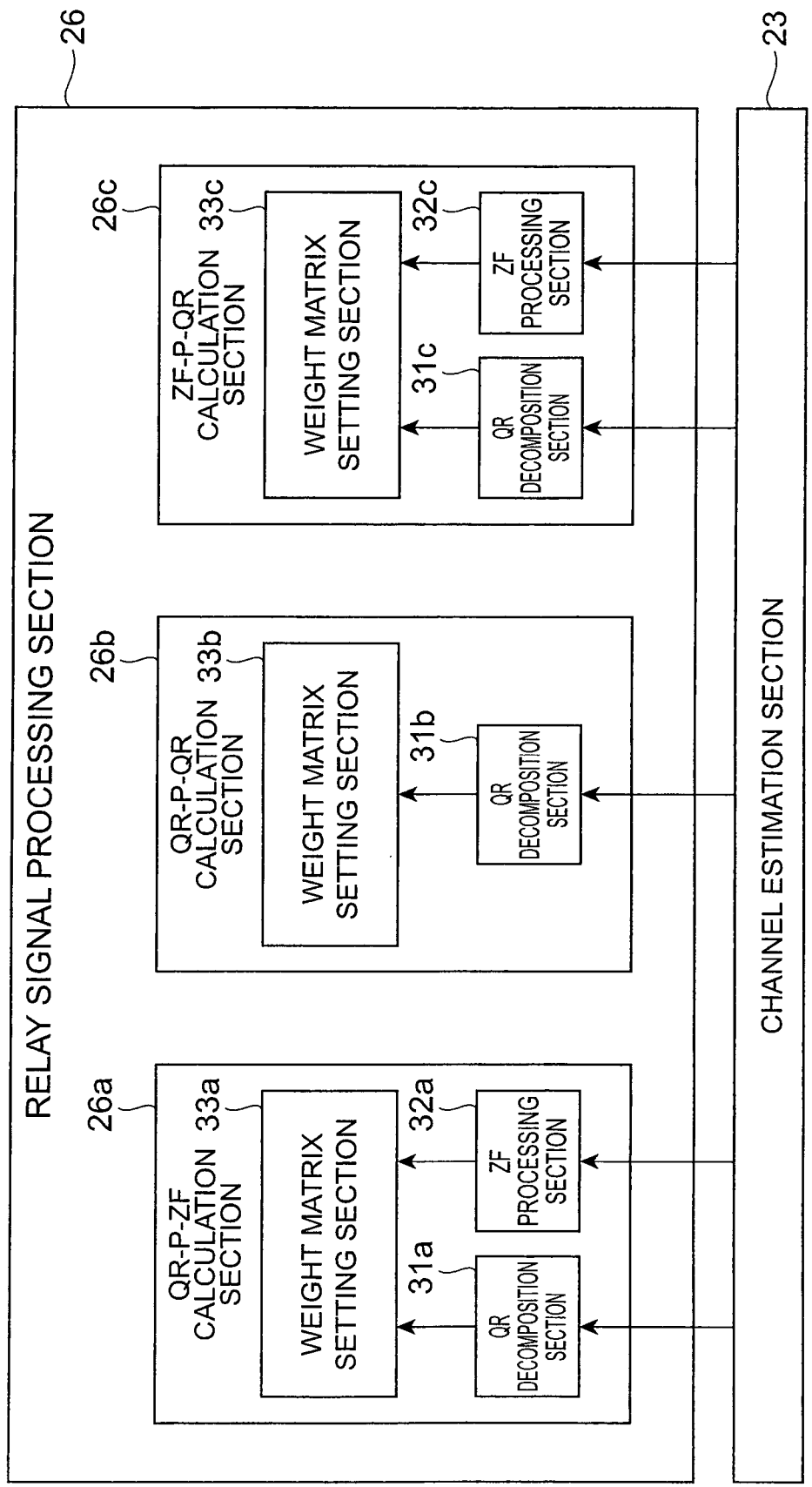
FIG. 4 is a block diagram showing the detail of the configuration of a relay signal processing section shown in FIG. 2.

The relay signal processing section 26 multiplies the received signal $Y_k$ by a conversion matrix corresponding to the relay method selected by the relay selecting section 25, and thereby converts the received signal $Y_k$ to an output matrix $D_k$. Such as relay signal processing section 26 has, as shown in FIG. 4: the QR-P-ZF calculation section 26a having a weight matrix setting section 33a, a QR decomposition section 31a and a ZF processing section 32a; the QR-P-QR calculation section 26b having a weight matrix setting section 33b and a QR decomposition section 31b: and the ZF-P-QR calculation section 26c having a weight matrix setting section 33c, a QR decomposition section 31c and a ZF processing section 32c.

Each of the QR decomposition sections 31a, 31b and 31c breaks down each of the channel matrices $H_k$ and $G_k$ received from the channel estimation section 23 into the form of a product of a unitary matrix and a triangular matrix. More specifically, each of the QR decomposition sections 31a, 31b and 31c derives, from the channel matrix $H_k$, a unitary matrix $Q_k$ and a triangular matrix $R_k$ expressed by the following equation (5):

$$H_k = Q_k R_k \quad (5)$$

The triangular matrix $R_k$ is a matrix in which the matrix elements of the $1^{st}$ to $(i-1)^{th}$ columns in the matrix elements in the $i^{th}$ row ($2 \leq i \leq M$) are zero, and is expressed by the following equation (6):

[Formula 1]

$$R_k = \begin{bmatrix} r_{11} & \cdots & r_{1M} \\ & \ddots & \vdots \\ 0 & & r_{MM} \end{bmatrix} \quad (6)$$

Moreover, each of the QR decomposition sections 31a, 31b and 31c derives, from the channel matrix $G_k$, a triangular matrix $P_k^H$ and a unitary matrix $O_k^H$ that are expressed by the following equation (7):

$$G_k = P_k^H O_k^H \quad (7)$$

(here, the superscript "H" denotes a conjugate transpose. The same hereinafter.) The triangular matrix $P_k$ is a matrix in which the matrix elements of the $1^s$ to $(i-1)^{th}$ columns in the matrix elements in the $i^{th}$ row ($2 \leq i \leq M$) are zero, and is expressed by the following equation (8). The triangular matrix $P_k^H$ is a lower triangular matrix.

[Formula 2]

$$P_k = \begin{bmatrix} p_{11} & \cdots & p_{1M} \\ & \ddots & \vdots \\ 0 & & p_{MM} \end{bmatrix} \quad (8)$$

The QR decomposition sections 31a, 31b and 31c output the obtained unitary matrices $Q_k$ and $O_k$ and triangular matrices $R_k$ and $P_k$ to the weight matrix setting sections 33a, 33b and 33c, respectively.

The ZF processing section 32a receives the channel matrix $G_k$ from the channel estimation section 23, subjects the channel matrix $G_k$ on the processing performed using a ZF method, and calculates a Moore-Penrose inverse matrix $F_k$ of the channel matrix $G_k$ by means of the following equation (9):

$$F_k = G^k (G_k G_k^H)^{-1} \quad (9)$$

The ZF processing section 32a outputs the calculated matrix $F_k$ to the weight matrix setting section 33a.

The ZF processing section 32c receives the channel matrix $H_k$ from the channel estimation section 23, subjects the channel matrix $H_k$ on the processing performed using the ZF method, and calculates a Moore-Penrose inverse matrix $J_k$ of the channel matrix $H_k$ by means of the following equation (10):

$$J_k = (H_k^H H^k)^{-1} H_k^H \quad (10)$$

The ZF processing section 32c outputs the calculated matrix $J_k$ to the weight matrix setting section 33c.

The weight matrix setting section 33a obtains a transmission weight matrix corresponding to the QR-P-ZF method on the basis of the matrices $F_k$, $Q_k$ and $R_{ks}$, and converts the received signal $Y_k$ to the output matrix $D_k$ by multiplying the received signal $Y_k$ by the transmission weight matrix by using the following equation (11)

$$D_k = E_k F_k A_k Q_k^H Y_k \quad (11)$$

It should be noted that the matrix $A_k$ is a diagonal matrix obtained from the following equation (12) by using the triangular matrix $R_k$, wherein non-zero matrix elements are derived from diagonal components of the triangular matrix $R_k$.

[Formula 3]

$$A_k = \begin{bmatrix} a_1^k & & 0 \\ & \ddots & \\ 0 & & a_M^k \end{bmatrix} \quad (12)$$

Specifically, $a^k_m = r_{mm}^*$ is established (the superscript "*" denotes a complex conjugate). Also, the coefficient $E_k$ is a coefficient for controlling the transmit power of the relay node to a fixed value P, and is defined by the following equation (13):

[Formula 4]

$$E_k = \sqrt{\frac{P}{P[tr\{(F_k A_k R_k)(F_k A_k R_k)^H\}] + tr(F_k F_k^H)\sigma^2}} \quad (13)$$

In the equation (13), P denotes the total transmit power in the source node 11, and $\sigma^2$ denotes noise power. The weight matrix setting section 33a outputs the obtained output matrix $D_k$ to the conversion matrix multiplication section 27.

The weight matrix setting section 33b obtains a transmission weight matrix corresponding to the QR-P-QR method on the basis of the matrices $O_k$, $Q_k$, $P_k$ and $R_k$, and converts the received signal $Y_k$ to the output matrix $D_k$ by multiplying the received signal $Y_k$ by the transmission weight matrix by using the following equation (14):

$$D_k = E_k O_k C_k Q_k^H Y_k \tag{14}$$

It should be noted that the matrix $C_k$ is a reversed diagonal matrix obtained from the following equation (15) by using the triangular matrices $P_k$ and $R_k$, wherein the matrix element of $i+j \ne M+1$ in the matrix elements in $i^{th}$ row and $j^{th}$ column is zero, and a diagonal matrix is obtained by inverting the order of the rows or columns.

[Formula 5]

$$C_k = \begin{bmatrix} 0 & & c_1^k \\ & \ddots & \\ c_M^k & & 0 \end{bmatrix} \tag{15}$$

Here, the matrix element $c_i^k$ is defined by the following equation (16):

[Formula 6]

$$c_i^k = \frac{(P_k^H \Pi R_k)_{i,M-i+1}^H}{\|(P_k^H \Pi R_k)_{i,M-i+1}^H\|} \tag{16}$$

In this equation, the conversion matrix Π is expressed by the following equation (17):

[Formula 7]

$$\Pi = \begin{bmatrix} 0 & & 1 \\ & \ddots & \\ 1 & & 0 \end{bmatrix} \tag{17}$$

Also, the coefficient $E_k$ is defined by the following equation (18).

[Formula 8]

$$E_k = \sqrt{\frac{PM}{P[tr\{(P_k^H C_k R_k)(P_k^H C_k R_k)^H\}] + MN\sigma^2}} \tag{18}$$

The weight matrix setting section 33b outputs the obtained output matrix $D_k$ to the conversion matrix multiplication section 27.

The weight matrix setting section 33c obtains a transmission weight matrix corresponding to the ZF-P-QR method on the basis of the matrices $J_k$, $Q_k$ and $P_k$, and converts the received signal $Y_k$ to the output matrix $D_k$ by multiplying the received signal $Y_k$ by the transmission weight matrix by using the following equation (19):

$$D_k = E_k O_k B_k J_k Y_k \tag{19}$$

It should be noted that the matrix $A_k$ is obtained in the same manner as in the equation (12) using the triangular matrix $P_k$, and the coefficient $E_k$ is obtained in the same manner as in the equation (13) using the matrices $J_k$, $P_k$ and $A_k$. The weight matrix setting section 33c outputs the obtained output matrix $D_k$ to the conversion matrix multiplication section 27.

Referring back to FIG. 2, the conversion matrix multiplication section 27 performs matrix calculation on the output matrix $D_k$ converted by the relay signal processing section 26, so that coherent combining can be performed among the plurality of relay methods on the destination node 13 side. Specifically, in the case in which the QR-P-ZF method is selected as the relay method by the relay selecting section 25, the conversion matrix multiplication section 27 multiplies the output matrix $D_k$ output from the relay signal processing section 26 by the conversion matrix Π expressed by the above equation (17), and thereby generates an output matrix $X_k$ by means of the following equation (20):

$$X_k = E_k F_k \Pi A_k Q_k^H Y_k \tag{20}$$

In this case, when a matrix is multiplied forward by the conversion matrix Π, the order of the rows of this matrix is inverted, and when a matrix is multiplied backward, the order of the columns of this matrix is inverted.

On the other hand, in the case in which the QR-P-QR method is selected as the relay method by the relay selecting section 25, the conversion matrix multiplication section 27 sets the output matrix $D_k$, which is output from the relay signal processing section 26, to the output matrix $X_k$ directly.

Moreover, in the case in which the ZF-P-QR method is selected as the relay method by the relay selecting section 25, the conversion matrix multiplication section 27 multiplies the output matrix $D_k$ output from the relay signal processing section 26 by the conversion matrix Π, and thereby generates the output matrix $X_k$ by means of the following equation (21):

$$X_k = E_k O_k \Pi B_k J_k Y_k \tag{21}$$

The conversion matrix multiplication section 27 outputs the generated output matrix $X_k$ to the transmitting section 28.

When the relay determining section 24 determines to relay the received signal $Y_k$, the transmitting section 28 transmits the output matrix $X_k = (X_{k1}, \ldots, X_{kM})$ to the destination node 13 via multiple radio antennas $21_1, \ldots, 21_M$ as the relay signal having M number of signal components. At this moment, the transmitting section 28 performs frequency conversion, band limitation, power amplification, weighting for each radio antenna, and other signal processing on this relay signal.

Figure 5:
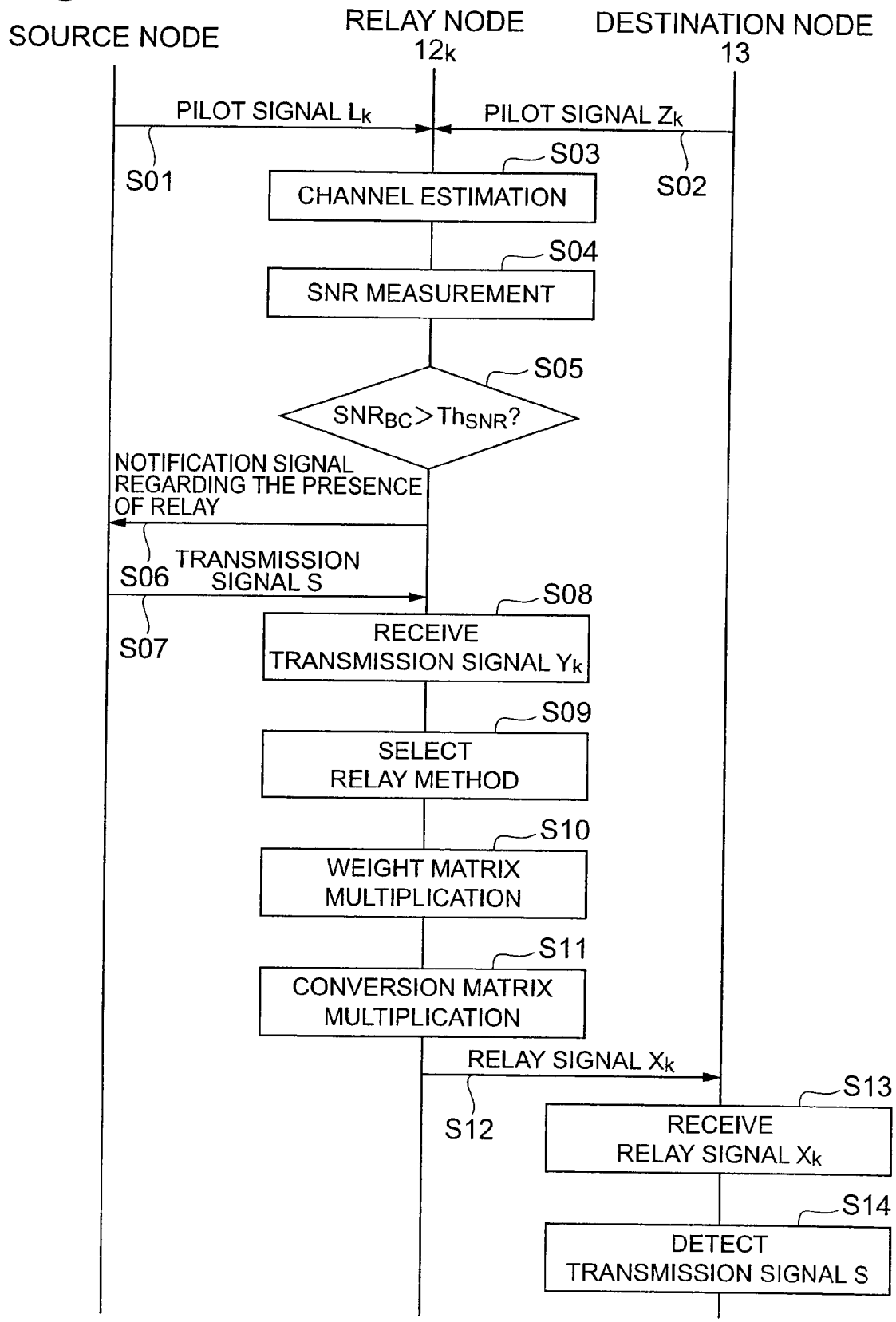
FIG. 5 is a sequence diagram showing an operation performed when a transmission signal is relayed in the communication system shown in FIG. 1.
Figure 6:
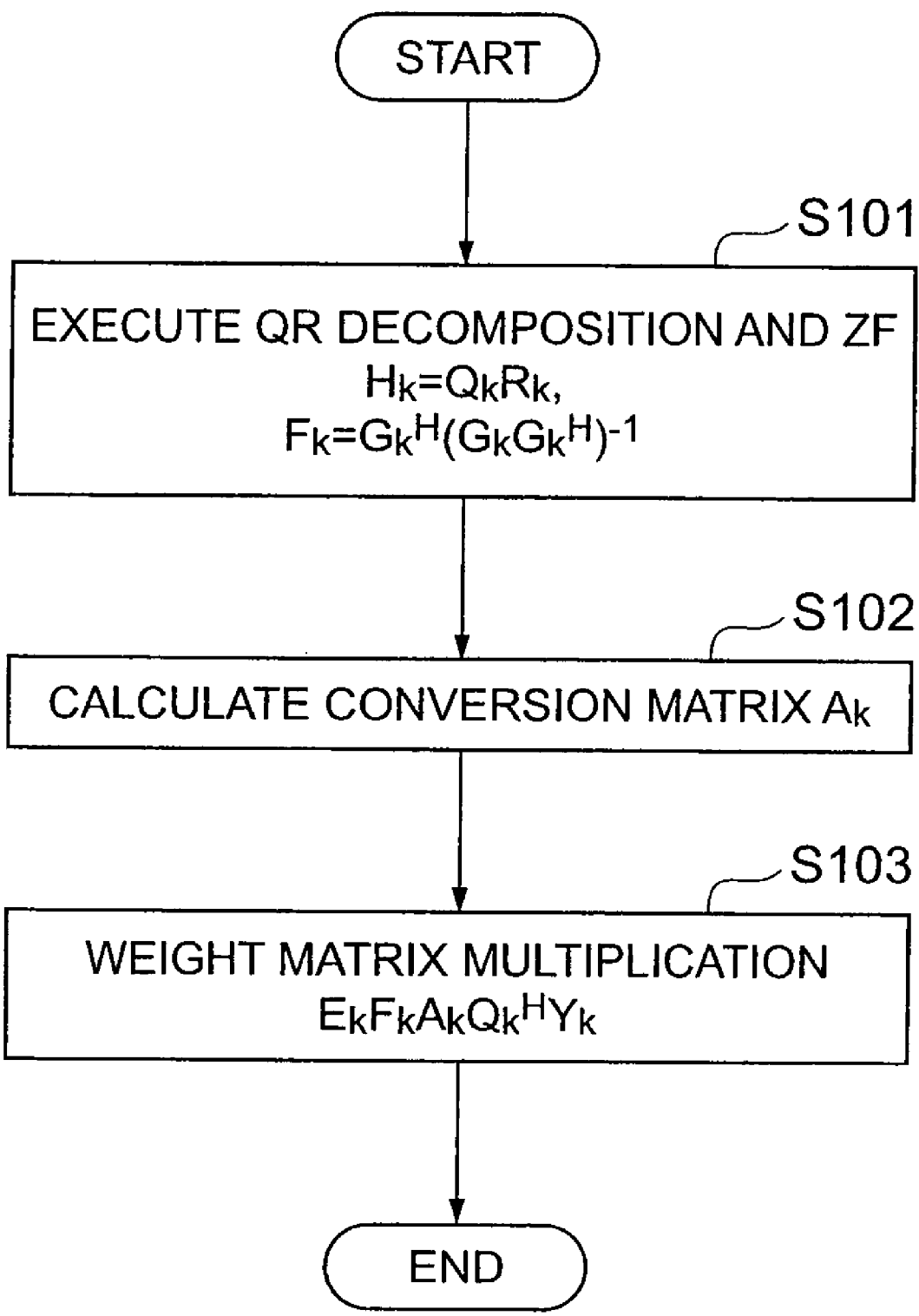
FIG. 6 is a flowchart showing the detail of an operation performed when transmission weight matrix calculation shown in FIG. 5 is performed.
Figure 7:
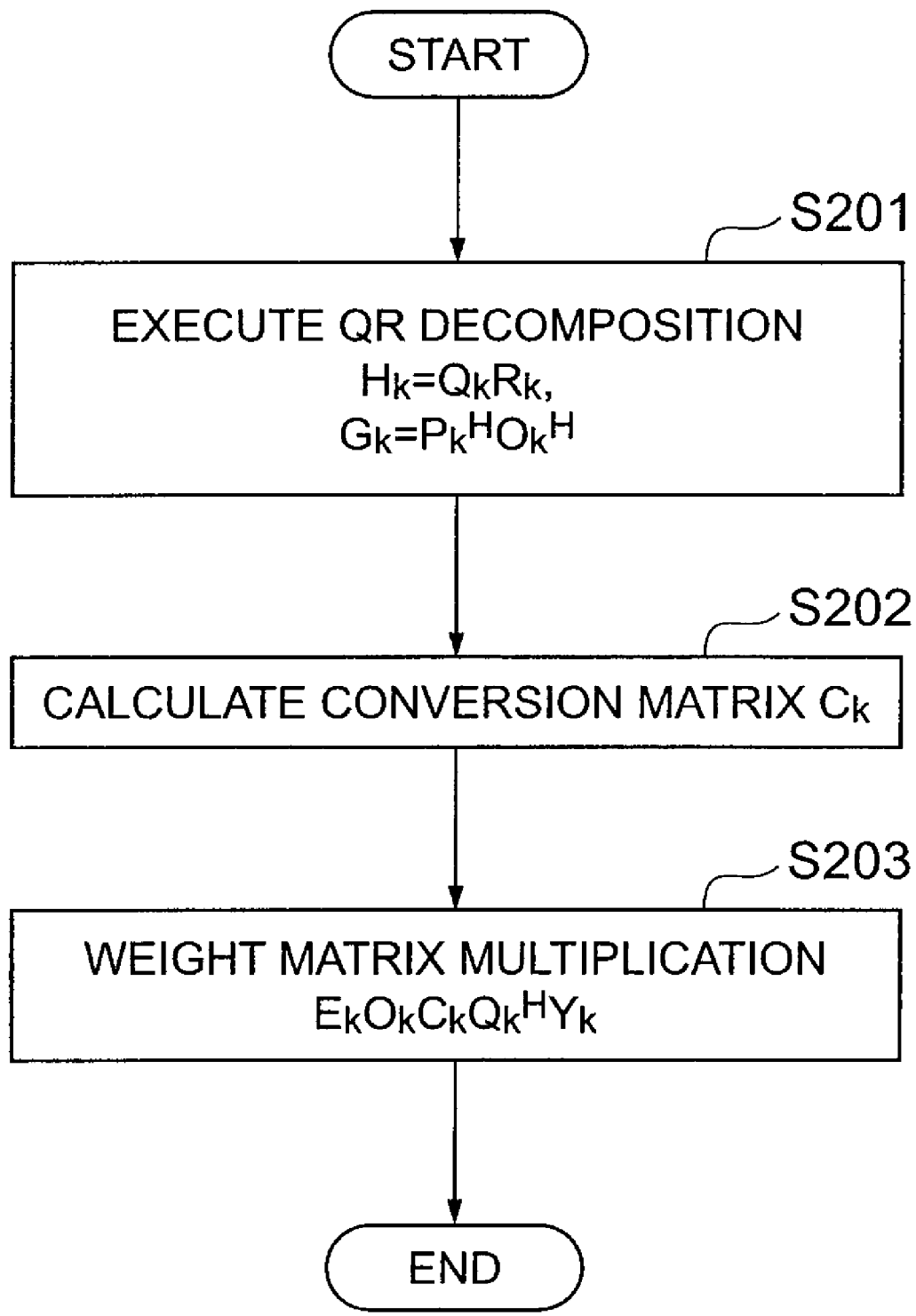
FIG. 7 is a flowchart showing the detail of an operation performed when transmission weight matrix calculation shown in FIG. 5 is performed.
Figure 8:
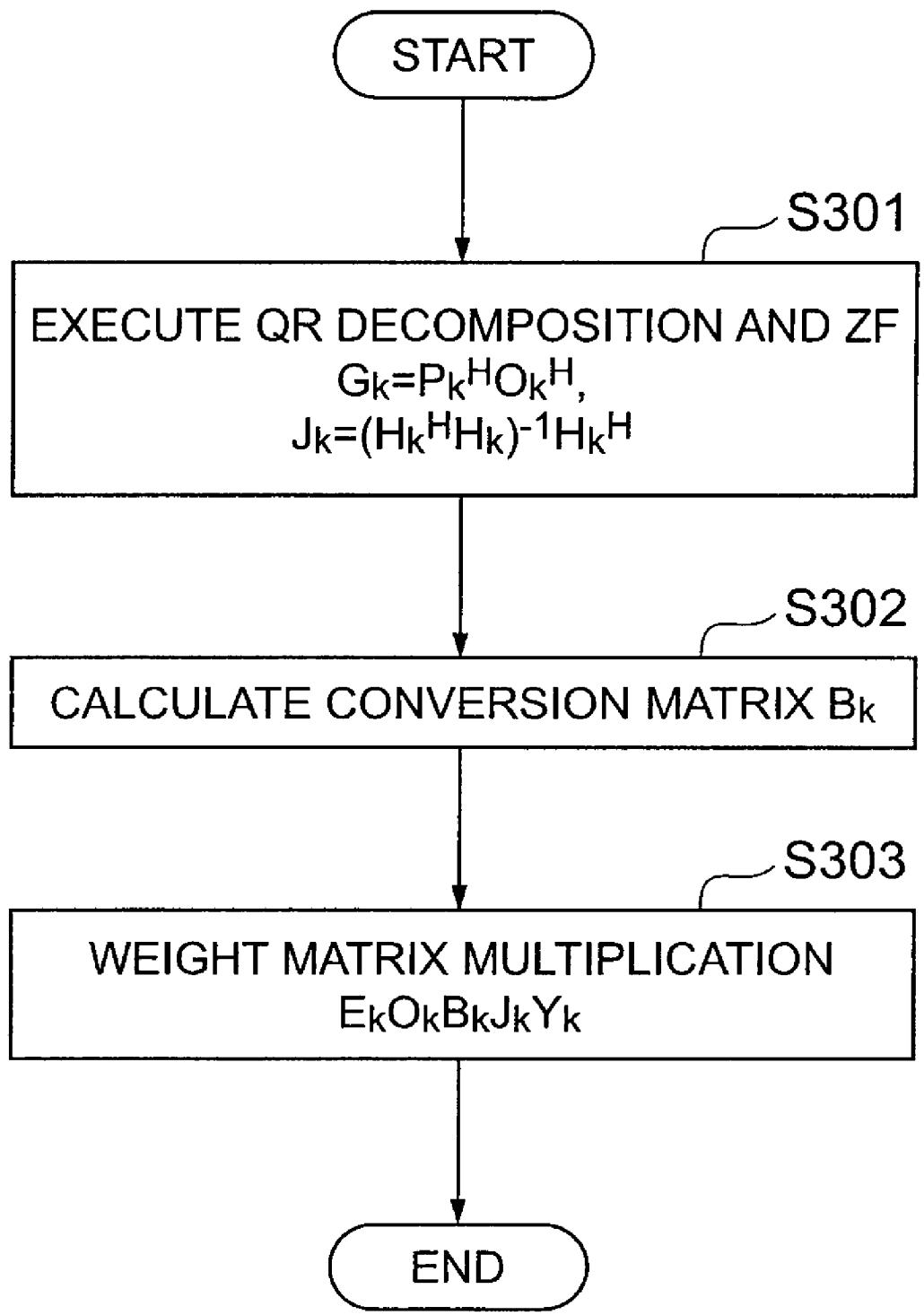
FIG. 8 is a flowchart showing the detail of an operation performed when transmission weight matrix calculation shown in FIG. 5 is performed.

Next, operation of the communication system 1 is described with reference to FIG. 5 to FIG. 8. FIG. 5 is a sequence diagram showing the operation performed when the transmission signal S is relayed from the source node 11 to the destination node 13 in the communication system 1. FIG. 6 to FIG. 8 each show a flowchart showing the operation performed when relaying the transmission signals S of the QR-P-ZF calculation section 26a, QR-P-QR calculation section 26b and ZF-P-QR calculation section 26c shown in FIG. 4.

First of all, FIG. 5 is referred to explain the operation performed when the transmission signal S is relayed from the source node 11 to the destination node 13 in the communication system 1. When the transmission signal S is transmitted from the source node 11, relay nodes located within a predetermined range from the source node 11 can receive the transmission signal S. In this predetermined range, a radio signal can be propagated by one hop. K number of relay nodes $12_k$ (k=1, ... K) perform the same signal processing on the signal received from the source node 11, and relay this signal to the destination node 13. FIG. 5 shows the operation of one of the K number of relay nodes $12_k$ (k=1, ... K).

First, prior to transmission of the transmission signal S, pilot signals $L_k$ and $Z_k$ are transmitted from the source node 11 and the destination node 13 respectively, and these pilot signals $L_k$ and $Z_k$ are received by the relay node $12_k$ (steps S01 and S02). In response to this, the channel estimation section 23 of the relay node $12_k$ performs channel estimation based on the received pilot signals $L_k$ and $Z_k$ to estimate the channel matrix $H_k$ of the backward channel and the channel matrix $G_k$ of the forward channel (step S03). Furthermore, the channel estimation section 23 measures the average received SNRs as the backward channel transmission quality and the forward channel transmission quality (step S04).

Next, the relay determination section 24 of the relay node $12_k$ compares the measured average received $SNR_{BC}{}^k$ of the backward channel with the threshold value $Th_{SNR}$, and thereby determines whether or not to relay the received signal $Y_k$ (step S05). The relay determination section 24 transmits the information on the result of the determination to the source node 11 (step S06). Thereafter, the transmission signal S is transmitted from the source node 11 (step S07). The transmission signal S sent from the source node 11 is changed to the received signal $Y_k$ by the characteristics of the backward channel while propagating through this channel, and is then received by the receiving section 22, the received signal being expressed by the following equation (22) (step S08):

$$Y_k = H_k S + n_k \quad (22)$$

Here, $n_k$ in the above equation denotes a noise component.

Once the received signal $Y_k$ is received by the receiving section 22, the relay selecting section 25 selects the relay method on the basis of the ratio between the average received SNRs of the backward and forward channels (step S09). Thereafter, the relay signal processing section 26 calculates the transmission weight matrix, depending on whether the selected relay method is the QR-P-ZF method, QR-P-QR method or ZF-P-QR method and multiplies the received signal by a transmission weight matrix (step S10). Next, when the QR-P-ZF method is selected, the conversion matrix multiplication section 27 multiplies the output matrix $D_k$ by the conversion matrix Π so as to invert the order of the rows in the transmission weight matrix of the output matrix $D_x$ that is output from the relay signal processing section 26. If the ZF-P-QR method is selected, the conversion matrix multiplication section 27 multiplies the output matrix $D_k$ by the conversion matrix Π so as to invert the order of the columns in the transmission weight matrix of the output matrix $D_k$ that is output from the relay signal processing section 26 (step S11).

Finally, the transmitting section 28 of the relay node $12_k$ transmits the output matrix $X_k$ of the conversion matrix multiplication section 27 to the destination node 13 as a relay signal (step S12). In response to this, by the destination node 13 signals from all of the relay nodes $12_k$ (k=1, ... K) that relay signals are superimposed and received, and a received signal $Y_R$ expressed by the following equation (23) is obtained (step S13):

[Formula 9]

$$Y_R = \sum_{k=1}^{K} G_k X_k + n_R \quad (23)$$

Then, after the signals $X_k$ and $Y_k$ are detected from the received signal $Y_R$ in the destination node 13, the transmission signal S is detected (step S14).

The procedure for calculating the transmission weight matrix performed in the step S10 is described in detail with reference to FIG. 6 to FIG. 8. When the selected relay method is the QR-P-ZF method, the relay signal processing section 26, first, executes QR decomposition and ZF to calculate the unitary matrix $Q_k$, triangular matrix $R_k$ and Moore-Penrose inverse matrix $F_k$ (step S101). Next, the relay signal processing section 26 obtains the conversion matrix $A_k$ from the diagonal components of the triangular matrix $R_k$ (step S102). Then, the relay signal processing section 26 multiplies the received signal $Y_k$ by the transmission weight matrix by using the equation (11) to calculate the output matrix $D_k$ (step S1103).

When, on the other hand, the selected relay method is the QR-P-QR method, the relay signal processing section 26 executes QR decomposition to calculate the unitary matrices $Q_k$ and $O_k$ and triangular matrices $R_k$ and $P_k$ (step S201). Next, the relay signal processing section 26 obtains the conversion matrix $C_k$ from the triangular matrices $R_k$ and $P_k$ (step S202). Then, the relay signal processing section 26 multiplies the received signal $Y_k$ by the transmission weight matrix by using the equation (14) to calculate the output matrix $D_k$ (step S203).

When the selected relay method is the ZF-P-QR method, the relay signal processing section 26, first, executes QR decomposition and ZF to calculate the unitary matrix $O_k$, triangular matrix $P_k$ and Moore-Penrose inverse matrix $J_k$ (step S301). Next, the relay signal processing section 26 obtains the conversion matrix $B_k$ from the diagonal components of the triangular matrix $P_k$ (step S302). Then, the relay signal processing section 26 multiplies the received signal $Y_k$ by the transmission weight matrix by using the equation (19) to calculate the output matrix $D_k$ (step S303).

According to the above-described relay node $12_k$ and relay method of this relay node, the backward channel transmission quality and the forward channel transmission quality are measured, the relay method to be applied in the relay node is selected from among the QR-P-ZF method, QR-P-QR method and ZF-P-QR method in accordance with the transmission qualities, and the transmission signal is multiplied by the transmission weight matrix corresponding to the selected relay method, whereby the transmission signal S that is received from the source node 11 is converted to the relay signal $X_k$, and thereafter this relay signal $X_k$ is transmitted to the destination node 13. Regarding the relay methods such as the QR-P-ZF method, QR-P-QR method and ZF-P-QR method, the relay method to be used for achieving the maximum channel capacity is different depending on the transmission quality of the backward and forward channels. Therefore, the relay method that is suitable for the transmission quality of the backward or forward channel of each relay node $12_k$ is selected, and the transmission signal S is processed using this selected relay method. Therefore, the channel capacity is increased when signals are relayed by the relay nodes $12_k$, and, as a result, the channel capacity of the entire communication system 1 can be improved effectively.

Also, matrix calculation is performed on the output matrix $D_k$ converted by the relay signal processing section 26 of the relay node $12_k$ so that coherent combining can be performed among the plurality of relay methods on the destination node 13 side, and this output matrix is transmitted as the relay signal $X_k$. Therefore, when the relay signals are received by the destination node 13 from the multiple relay nodes $12_1, ..., 12_K$, the relay signals from the respective relay nodes are subjected to coherent combining, thus the channel capacity of the entire communication system 1 can be further improved.

FIG. 9 is a diagram showing an image of the transmission weight matrix calculated in the relay node $12_k$. In this figure, successive transmission weight matrices to be multiplied by the conversion matrix Π are shown for each relay method at the top and bottom of the figure. When the QR-P-ZF method is selected as the relay method, the transmission weight matrix is derived in the form of the upper right triangular matrix before being multiplied by the conversion matrix Π, and the transmission weight matrix is derived in the form of the lower right triangular matrix after being multiplied by the conversion matrix Π. When, on the other hand, the ZF-P-QR method is selected as the relay method, the transmission weight matrix is derived in the form of the lower left triangular matrix before being multiplied by the conversion matrix Π, and the transmission weight matrix is derived in the form of the lower right triangular matrix after being multiplied by the conversion matrix Π. Also, when the QR-P-QR method is selected as the relay method, the transmission weight matrix remains in the form of the lower right triangular matrix. The transmission weight matrix is set in such manner so that, on the destination node 13 side, coherent combining can be performed on the relay signals $X_k$ transmitted from multiple relay nodes $12_k$, regardless of the relay method. Furthermore, the signal power level increases when the signals are relayed by the relay node $12_k$, so as to be able tolerant of the noise, and, as a result, the channel capacity increases.

Moreover, on the basis of the transmission quality of the backward channel measured by the channel estimation section 23, it is determined whether the transmission signal S is relayed to the destination node 13 or not, thus it is possible to prevent the relay node $12_k$ from performing unwanted signal relay when the channel capacity is not ensured.

In addition, the relay selecting section 25 selects the relay method in accordance with the ratio between the SNRs of the backward and forward channels. Since the characteristics of the channel capacity of each of the QR-P-QR method, QR-P-ZF method and ZF-P-QR method rely largely on the ratio between the backward channel transmission quality and the forward channel transmission quality, the channel capacity can be improved more reliably.

It should be noted that the present invention is not limited to the embodiments described above. For example, regarding the transmission quality that is measured by the channel estimation section 23, the transmission quality of the average received SNR, instant SNR or the like may be measured, and the relay method may be determined based on this transmission quality.

The relay selecting section 25 may select the relay method in accordance with the transmission quality of either the backward channel or the forward channel, and the relay determination section 24 may determine whether to relay the transmission signal S in accordance with the transmission quality of either the backward channel or the forward channel.

DESCRIPTION OF THE REFERENCE NUMERALS

1 Communication system 11 Source node $12_k$ Relay node 13 Destination node 22 Receiving section (receiving means) 23 Channel estimation section (measuring means) 24 Relay determination section (determination means) 25 Relay selecting section (selecting means) 26 Relay signal processing section (converting means) 27 Conversion matrix multiplication section (matrix calculation means) 28 Transmitting section (transmitting means) S Transmission signal $X_k$ Relay signal

What is claimed is:

1. A relay node for relaying a transmission signal, which is transmitted from a source node, to a destination node by using a multiple-input multiple-output (MIMO) system, the relay node comprising:
   receiving means for receiving the transmission signal from the source node;
   measuring means for measuring at least either transmission quality of a backward channel that is a transmission path between the source node and the relay node, or transmission quality of a forward channel that is a transmission path between the relay node and the destination node;
   selecting means for selecting a relay method as a conversion scheme for converting the transmission signal in the relay node, from among a plurality of relay methods in accordance with at least either the backward channel transmission quality or the forward channel transmission quality that is estimated by the measuring means;
   converting means for converting the transmission signal to a relay signal by multiplying the transmission signal by a conversion matrix corresponding to the relay method selected by the selecting means; and
   transmitting means for transmitting the relay signal obtained by conversion by the converting means to the destination node.

2. The relay node according to claim 1, further comprising matrix calculation means for performing matrix calculation on the relay signal obtained by conversion by the converting means, so that coherent combining can be performed among the plurality of relay methods on the destination node, wherein the transmitting means transmits the relay signal on which the matrix calculation is performed by the matrix calculation means.

3. The relay node according to claim 1, further comprising determination means for determining whether or not to relay the transmission signal to the destination node, in accordance with at least either the backward channel transmission quality or the forward channel transmission quality measured by the measuring means, wherein the transmitting means transmits the relay signal when the determination means determines to relay the transmission signal.

4. The relay node according to claim 1, wherein
   the measuring means measures both the backward channel transmission quality and the forward channel transmission quality,
   the selecting means selects, in accordance with the backward channel transmission quality and the forward channel transmission quality that are estimated by the measuring means, a relay method from among a QR-P-QR method for performing QR decomposition on each of the backward and forward channels, a QR-P-ZF method for performing QR decomposition and then zero-forcing (ZF) on each of the backward and forward channels, and ZF-P-QR method for performing zero-forcing (ZF) and then QR decomposition on each of the backward and forward channels, and
   when the QR-P-ZF method is selected by the selecting means, performs matrix calculation such that the order of rows in an output matrix of the converting means is inverted, and when the ZF-P-QR method is selected by the selecting means, the matrix calculation means performs matrix calculation such that the order of columns in the output matrix of the converting means is inverted.

5. The relay node according to claim 4, wherein the measuring means measures both the backward channel transmission quality and the forward channel transmission quality, and the selecting means selects the relay method in accordance with a ratio between the backward channel transmission quality and the forward channel transmission quality that are measured by the measuring means.

6. A relay method for relaying a transmission signal, which is transmitted from a source node, to a destination node by using a multiple-input multiple-output (MIMO) system, the relay method comprising:

a receiving step in which receiving means receives the transmission signal from the source node;

a measuring step in which measuring means measures at least either transmission quality of a backward channel that is a transmission path between the source node and a relay node, or transmission quality of a forward channel that is a transmission path between the relay node and the destination node;

a selecting step in which selecting means selects a relay method as a conversion scheme for converting the transmission signal in the relay node, from among a plurality of relay methods in accordance with at least either the backward channel transmission quality or the forward channel transmission quality estimated in the measuring step;

a converting step in which converting means converts the transmission signal to a relay signal by multiplying the transmission signal by a conversion matrix corresponding to the relay method selected in the selecting step; and a transmitting step in which transmitting means transmits the relay signal obtained by conversion in the converting step to the destination node.

* * * * *